US009581258B2

(12) United States Patent
Fletcher et al.

(10) Patent No.: US 9,581,258 B2
(45) Date of Patent: Feb. 28, 2017

(54) CHECK VALVE WITH IMPROVED SEALING MEMBER

(71) Applicants: David Fletcher, Flint, MI (US); James H. Miller, Ortonville, MI (US); Rex Bravo, Detroit, MI (US); Andrew Niedert, Farmington, MI (US); Matt Gilmer, Whitmore Lake, MI (US)

(72) Inventors: David Fletcher, Flint, MI (US); James H. Miller, Ortonville, MI (US); Rex Bravo, Detroit, MI (US); Andrew Niedert, Farmington, MI (US); Matt Gilmer, Whitmore Lake, MI (US)

(73) Assignee: DAYCO IP HOLDINGS, LLC, Troy, MI (US)

(*) Notice: Subject to any disclaimer, the term of this patent is extended or adjusted under 35 U.S.C. 154(b) by 0 days.

(21) Appl. No.: 14/600,598

(22) Filed: Jan. 20, 2015

(65) Prior Publication Data
US 2015/0204452 A1 Jul. 23, 2015

Related U.S. Application Data

(60) Provisional application No. 61/929,264, filed on Jan. 20, 2014.

(51) Int. Cl.
F16K 15/00 (2006.01)
F16K 15/06 (2006.01)
F16K 15/02 (2006.01)

(52) U.S. Cl.
CPC ............ F16K 15/06 (2013.01); F16K 15/023 (2013.01); Y10T 137/7915 (2015.04)

(58) Field of Classification Search
CPC ...... F16K 15/021; F16K 15/023; F16K 15/08; F16K 15/141; F16K 1/44; Y10T 137/7866;
(Continued)

(56) References Cited

U.S. PATENT DOCUMENTS 1,845,969 A    2/1932  Hueber
2,274,276 A *  2/1942  Rappl .................. F16K 15/023
                                                    137/119.09
(Continued)

FOREIGN PATENT DOCUMENTS

DE    4310761    10/1994
GB    2129516    5/1984

OTHER PUBLICATIONS

PCT, International Search Report and Written Opinion, PCT/US2014/041250 (Oct. 27, 2014).
(Continued)

Primary Examiner — Jessica Cahill
(74) Attorney, Agent, or Firm — Thompson Hine LLP

(57) ABSTRACT

Check valves are disclosed, including check valve included in an aspirator, that includes a housing defining an internal cavity having a first port and a second port both in fluid communication therewith, and a sealing member within the cavity. The sealing member is translatable between a closed position against a first seat within the internal cavity of the housing and an open position against a second seat within the internal cavity of the housing. The sealing member has a sealing material positioned for sealing engagement with the first seat when the sealing member is in the closed position and a reinforcing member positioned for engagement with the second seat when the sealing member is in the open position.

20 Claims, 5 Drawing Sheets

(58) Field of Classification Search
CPC ........... Y10T 137/137; Y10T 137/7862; Y10T 137/7896; Y10T 137/7918; Y10T 137/7919; Y10T 137/7913; Y10T 137/7916
USPC .................................................... 137/533.27
See application file for complete search history.

(56) References Cited

U.S. PATENT DOCUMENTS

| | | | |
|---|---|---|---|
| 2,512,479 A | 6/1950 | Callejo | |
| 2,626,009 A | 1/1953 | Sebok et al. | |
| 2,905,268 A | 9/1959 | McMichael | |
| 2,954,091 A | 9/1960 | McMichael | |
| 3,093,153 A * | 6/1963 | Horowitz | F16K 15/023 137/102 |
| 3,234,932 A | 2/1966 | Bird et al. | |
| 3,698,510 A | 10/1972 | Blatt et al. | |
| 3,754,841 A | 8/1973 | Grabb et al. | |
| 3,923,081 A * | 12/1975 | Persson | E03C 1/12 137/217 |
| 4,211,200 A | 7/1980 | Rocchio et al. | |
| 4,354,492 A * | 10/1982 | McPhee | A61M 5/40 137/528 |
| 4,499,034 A | 2/1985 | McAllister | |
| 4,519,423 A | 5/1985 | Ho et al. | |
| 4,554,786 A | 11/1985 | Takeuchi et al. | |
| 4,556,086 A * | 12/1985 | Raines | F16K 15/141 137/843 |
| 5,108,266 A | 4/1992 | Hewitt | |
| 5,188,141 A | 2/1993 | Cook et al. | |
| 5,291,916 A | 3/1994 | Kloosterman et al. | |
| 5,326,942 A | 7/1994 | Schmid | |
| 5,375,621 A * | 12/1994 | Gaehwiler | F16K 15/148 137/220 |
| RE35,532 E * | 6/1997 | Duren | E03C 1/122 137/516.15 |
| 5,816,446 A | 10/1998 | Steindorf et al. | |
| 5,881,759 A * | 3/1999 | Andersson | E03C 1/122 137/246 |
| 6,035,881 A | 3/2000 | Emmerich et al. | |
| RE37,090 E | 3/2001 | Kloosterman et al. | |
| 6,220,271 B1 | 4/2001 | Emmerich et al. | |
| 6,308,731 B1 | 10/2001 | Kawasaki | |
| 7,353,812 B1 | 4/2008 | Gosdzinski et al. | |
| 7,610,140 B2 | 10/2009 | Hirooka | |
| 7,628,170 B2 | 12/2009 | Kok-Hiong et al. | |
| 7,722,132 B2 | 5/2010 | Carlsson | |
| 8,136,548 B2 * | 3/2012 | Trueb | E03C 1/12 137/526 |
| 8,147,225 B2 * | 4/2012 | Kuny | F04B 39/102 137/542 |
| 8,517,056 B2 | 8/2013 | Cullin | |
| 2005/0061378 A1 | 3/2005 | Foret | |
| 2005/0257838 A1 * | 11/2005 | Enerson | F16K 15/023 137/528 |
| 2006/0016477 A1 | 1/2006 | Zaparackas | |
| 2007/0044848 A1 | 3/2007 | Norman | |
| 2011/0132311 A1 | 6/2011 | Pursifull et al. | |
| 2011/0186151 A1 | 8/2011 | Sparazynski | |
| 2013/0213510 A1 | 8/2013 | Burnham et al. | |
| 2013/0233276 A1 | 9/2013 | Pursifull et al. | |
| 2013/0233287 A1 | 9/2013 | Leone | |
| 2014/0014080 A1 | 1/2014 | Beshay et al. | |
| 2014/0165962 A1 | 6/2014 | Pursifull | |
| 2014/0360607 A1 | 12/2014 | Fletcher et al. | |

OTHER PUBLICATIONS

PCT, International Search Report and Written Opinion, PCT/US2015/012018 (May 8, 2015).
PCT, International Search Report and Written Opinion, PCT/US2015/039950 (Oct. 5, 2015).
PCT, International Search Report and Written Opinion; Application No. PCT/US2015/033079 (Aug. 21, 2015).
US, Non-Final Office Action, U.S. Appl. No. 14/509,612; (Dec. 18, 2015).
US, Final Office Action; U.S. Appl. No. 14/509,612; (Jun. 22, 2016).
US, Non-Final Office Action; U.S. Appl. No. 14/565,075; (Jul. 21, 2016).
US, Final Office Action; U.S. Appl. No. 14/294,727; (Apr. 22, 2016).
US, Final Office Action; U.S. Appl. No. 14/565,075; (Apr. 1, 2016).

* cited by examiner

CHECK VALVE WITH IMPROVED SEALING MEMBER

RELATED APPLICATIONS

This application claims the benefit of U.S. Provisional Application No. 61/929,264, filed Jan. 20, 2014, the entirety of which is incorporated herein by reference.

TECHNICAL FIELD

This application relates to check valves for use in engine systems such as internal combustion engines, more particularly to check valves having an improved sealing member.

BACKGROUND

Engines, for example vehicle engines, have included aspirators and/or check valves for a long time. Typically, the aspirators are used to generate a vacuum that is lower than engine manifold vacuum by inducing some of the engine air to travel through a venturi. The aspirators may include check valves therein or the system may include separate check valves. When the check valves are separate, they are typically included downstream between the source of the vacuum and the device using the vacuum.

In engines that have a brake boost system, conditions exist that may make it difficult for a check valve to seal effectively. This is undesirable, and new check valves are needed to provide more efficient sealing.

SUMMARY

In one aspect, check valve units are disclosed that are connectable into a fluid communication system, for example those systems in an internal combustion engine. In one embodiment, the check valve includes a housing defining an internal cavity having a first port and a second port both in fluid communication therewith, and a sealing member within the cavity. The sealing member is translatable between a closed position against a first seat within the internal cavity of the housing and an open position against a second seat within the internal cavity of the housing. The sealing member has a sealing material positioned for sealing engagement with the first seat when the sealing member is in the closed position and a reinforcing member positioned for engagement with the second seat when the sealing member is in the open position. The second seat may be a plurality of radially spaced apart fingers extending into the internal cavity. The first seat may include a first annular seal bead surrounding an opening defined by the housing for fluid communication between the internal cavity and the first port. The sealing member seals in the closed position under a change in pressure of about 1.0 kPag to about 6.0 kPag.

In one embodiment, the reinforcing member is mounted on the exterior surface of the sealing material or is encased within the sealing material. In another embodiment, the sealing material is over-molded onto a portion of the reinforcing member. When assembled, the reinforcing material of the sealing member is positioned above, but radially inward relative to the position of the first annular seal bead. In one embodiment, with such a positioned reinforcing material, the first seat may also include a second annular seal bead disposed radially inward of the first annular seal bead. Here, the reinforcing material is positioned above both the first and second annular seal beads and is further radially outward relative to the position of the second annular seal bead.

In one aspect, the width of the reinforcing member is proportional to the dimensions of the portion of the second seat that engages the sealing member. When the reinforcing member is a ring of material, the width is the difference between the inner diameter and the outer diameter of the ring of material.

In one embodiment, the housing includes a pin and the sealing member may include a bore therethrough. Once the check valve is assembled, the pin of the housing is received in the bore of the sealing member for translation of the sealing member along the pin.

In another embodiment, the housing may include one or more guides positioned about the periphery of the sealing member, and the sealing member may include fluting in its periphery that aligns with one or more guides.

In another aspect, aspirators are disclosed that include check valves therein that have the sealing member with a reinforcing member as described herein. The use of the word "aspirator" is not intended to be construed in a limiting manner and includes devices with a Venturi gap that operates with atmospheric pressure as the motive flow or operates with greater than atmospheric spheric pressure, for example, boosted air from a turbocharge, as the motive flow. The check valve may be positioned within the aspirator to control fluid flow through a suction port aligned with a Venturi gap. In one embodiment, the aspirator includes a second check valve controlling fluid flow through a bypass downstream from the Venturi gap. The second check valve may also have a sealing member with a reinforcing member as described herein.

DETAILED DESCRIPTION

Figure 2:
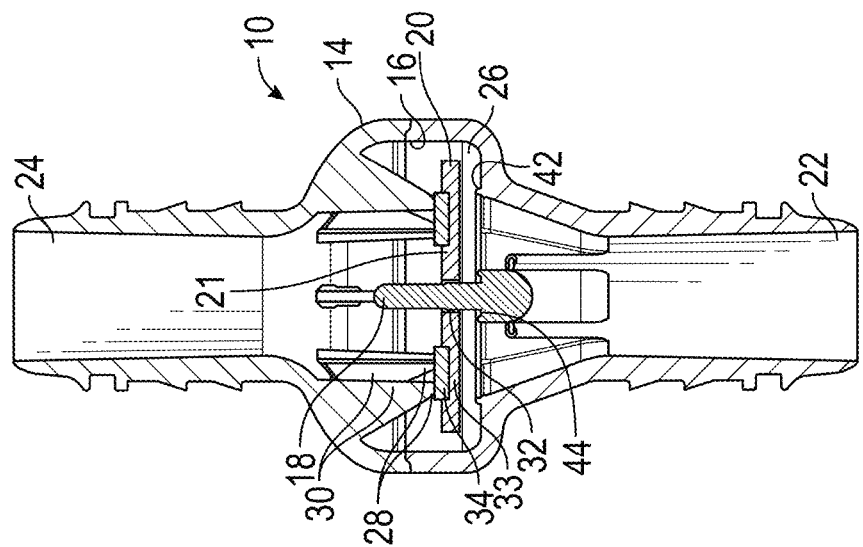
FIG. 2 is a longitudinal, cross-sectional view of the check valve of FIG. 1.

The following detailed description will illustrate the general principles of the invention, examples of which are additionally illustrated in the accompanying drawings. In the drawings, like reference numbers indicate identical or functionally similar elements.

As used herein, "fluid" means any liquid, suspension, colloid, gas, plasma, or combinations thereof.

Figure 1:
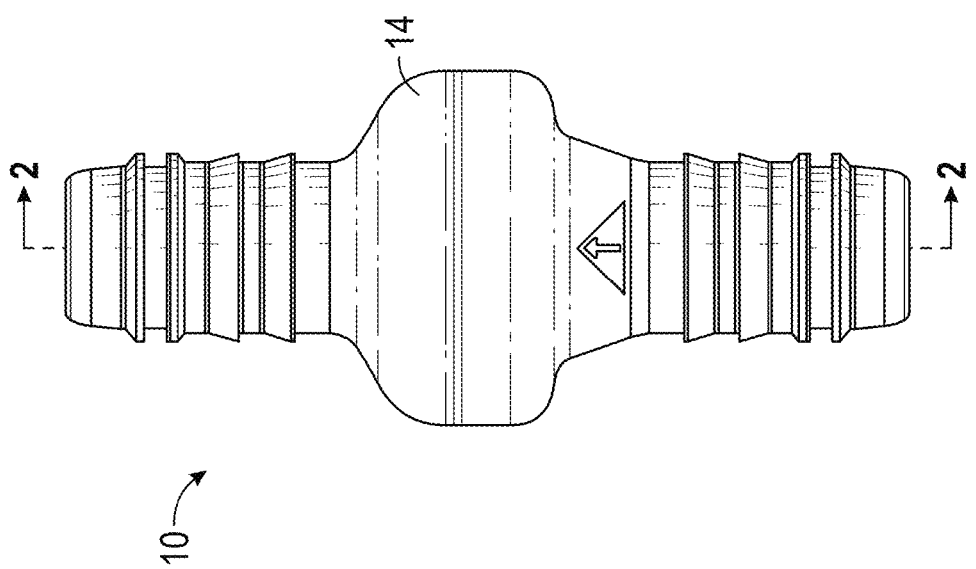
FIG. 1 is a front perspective view of a check valve.

FIGS. 1-2 disclose a check valve 10 that includes a housing 14 defining an internal cavity 16 having a pin 18 therein upon which is seated a sealing member 20 and defining a first port 22 in fluid communication with the internal cavity 16 and a second fluid port 24 in fluid communication with the internal cavity 16. The housing 14 may be a multiple piece housing with pieces connected together with a fluid-tight seal. The internal cavity 16 typically has larger dimensions than the first port 22 and the second port 24. In the illustrated embodiment, the first port 22 and the second port 24 are positioned opposite one another to define a generally linear flow path through the check valve 10, when the sealing member 20 is not present, but is not limited to this configuration. In another embodiment, the first and fluid ports may be positioned relative to one another at an angle of less than 180 degrees. The portion of the housing 14 defining the internal cavity 16 includes an internal first seat 26 upon which the sealing member 20 seats when the check valve is "closed" and a second seat 28 upon which the sealing member seats when the check valve is "open." In FIG. 2, the second seat 28 is a plurality of radially spaced fingers 30 extending into the internal cavity 16 from an interior surface of the internal cavity 16 that is more proximate the second port 24.

Figure 3A:
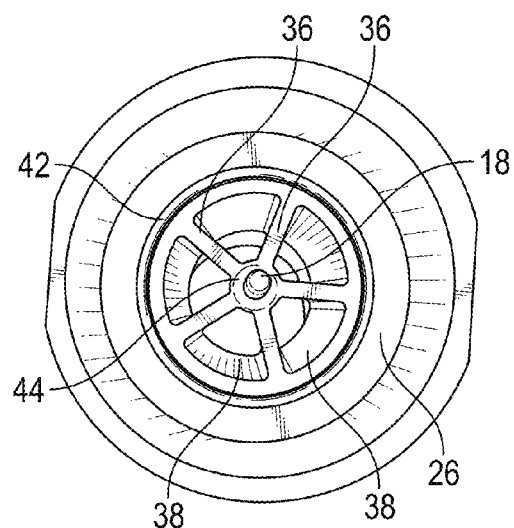
FIG. 3A is a top plan view of the check valve without the sealing member.
Figure 3B:
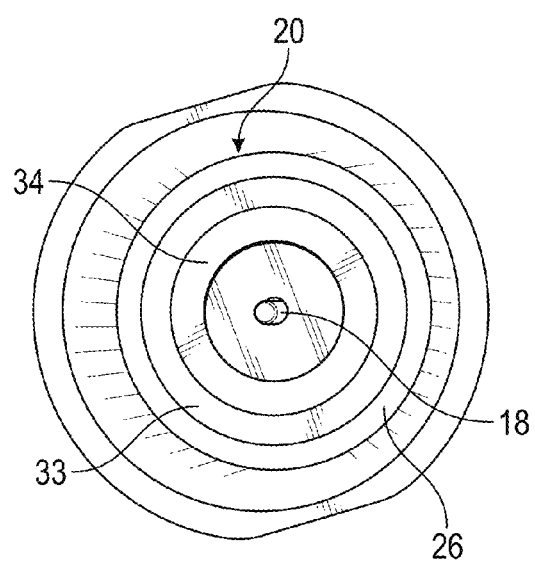
FIG. 3B is a top plan view of the check valve with the sealing member positioned in the cavity.

A top view looking into the internal cavity 16 is shown in FIG. 3A. Here, the pin 18 is seen centrally positioned within the internal cavity 16 and a plurality of arms 36 are extending radially outward from the pin 18 to subdivide the flow path leading into the internal cavity 16 into a plurality of conduits 38 to direct the fluid flow around the periphery of the sealing member 20 when the check valve 10 is in an open position. In FIG. 3B, the sealing member 20 has been placed onto the pin within the internal cavity 16 of FIG. 3A. As seen, the reinforcing member 34 is facing upward toward the viewer, which will be toward the second port 24 in a fully assembled check valve 10.

Figure 3C:
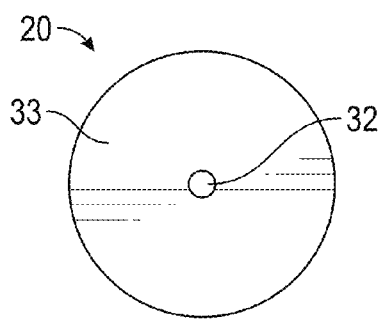
FIG. 3C is a bottom plan view of the sealing member.
Figure 3D:
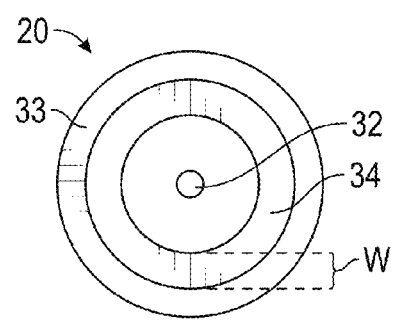
FIG. 3D is a top plan view of the sealing member.
Figure 6:
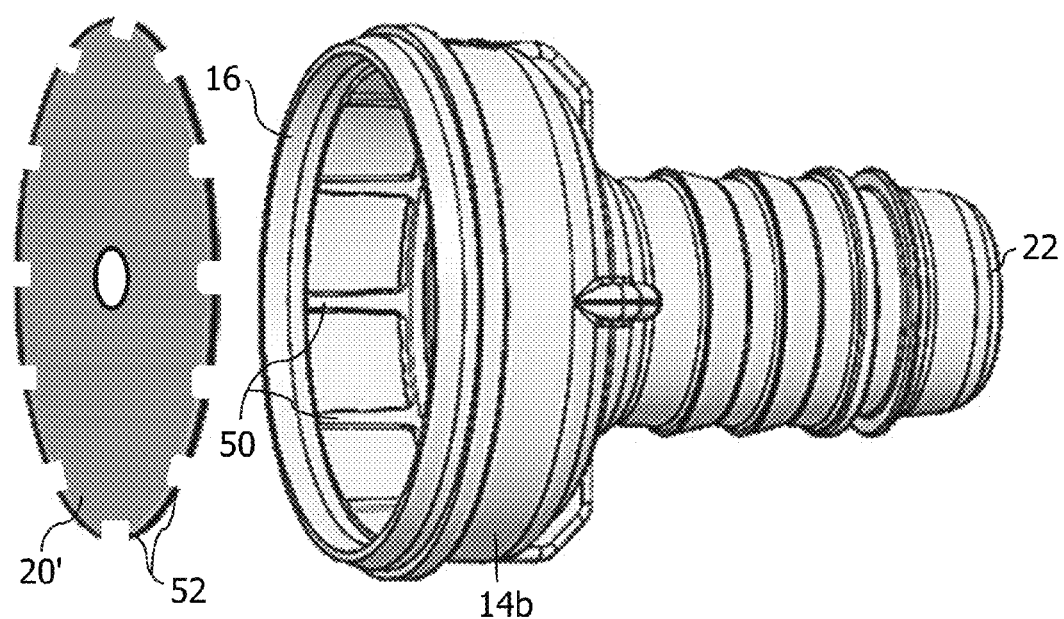
FIG. 6 is a front perspective view of one embodiment of a section of the housing and the sealing member in an un-assembled state.

The sealing member 20 is reinforced for improved performance, in particular in a brake boost system within an engine. The sealing member 20 as seen in FIGS. 3B to 3D includes a sealing material 33 and a reinforcing member 34. The illustrated embodiment has a generally central bore 32 to receive pin 18, but is not limited thereto. In another embodiment shown in FIG. 6, one or more guides 50 may be positioned about the periphery of the sealing member 20' in the cavity, defined in part by housing section 14b, and the sealing member 20' may or may not include fluting 52 that receives the guides 50. As shown in FIGS. 2, and 3B, the reinforcing member 34 may be mounted on the exterior surface 21 of the sealing member 20 that faces the second seat 28, or in other embodiments may be over-molded at least partially by the sealing material 33 or encased within the sealing material 33. In one embodiment, the reinforcing member 34 is or includes metal having a rigidity enabling the sealing member 20 to withstand extruding when a high change in pressure is experienced. As used herein, "metal" is used generically to represent all materials that may be pure metal, metal alloys, metal composites, and combinations thereof having a suitable rigidity. In another embodiment, the reinforcing member 34 may be carbon fiber or plastics such as nylon or acetyl with or without fill (typically 30% by volume) such as glass, mineral, and the like.

The reinforcing member 34 may be a ring of material, such as those described above. The ring has an inner diameter and an outer diameter. As used herein, the width W (FIG. 3D) of the ring is the difference between the inner diameter and the outer diameter. The width W of the ring is proportional to the second seat 28 to provide stability to the sealing member 20 when in the open position. In check valve 10, the width is generally about 1 mm to about 10 mm. In another embodiment, the width of the check vale is about 2 mm to about 4 mm. The ring of reinforcing material also has a thickness. The thickness may be about 0.05 mm to about 1.00 mm, but in another embodiment may be 0.02 mm to about 0.5 mm. Typically, reinforcing material 34 is within the outer seal bead 42 and outer sealing material 33, but is not limited thereto. Also, the reinforcing material 34 is typically outside of the inner seal bead 44 and outside of the hole 32 in the sealing material 33, if a hole exists, but is not limited thereto. Note that there may or may not be an inner guide pin 18 and therefore no need for a center hole 32 on the sealing material 33. It is preferred that the second seat 28 lines up somewhere within the width W of the reinforced material 34.

The check valve 10 in one embodiment is for inclusion in a brake boost system and seals at very low change in pressure, for example a change in pressure of about 1.0 kPag to 6.0 kPag or more specifically about 2.4 kPag to about 4.4 kPag, but can withstand high changes in pressure such as a change in pressure of about 500 kPag to about 2,500 kPag or more specifically about 1,000 kPag to about 1,800 kPag. Additionally, the addition of the reinforcing member 34 improves the leak rate of the check valve. The leak rate is about 0.2 cc/min to about 2 cc/min, or more specifically about 0.3 cc/min to about 0.7 cc/min.

Figure 4:
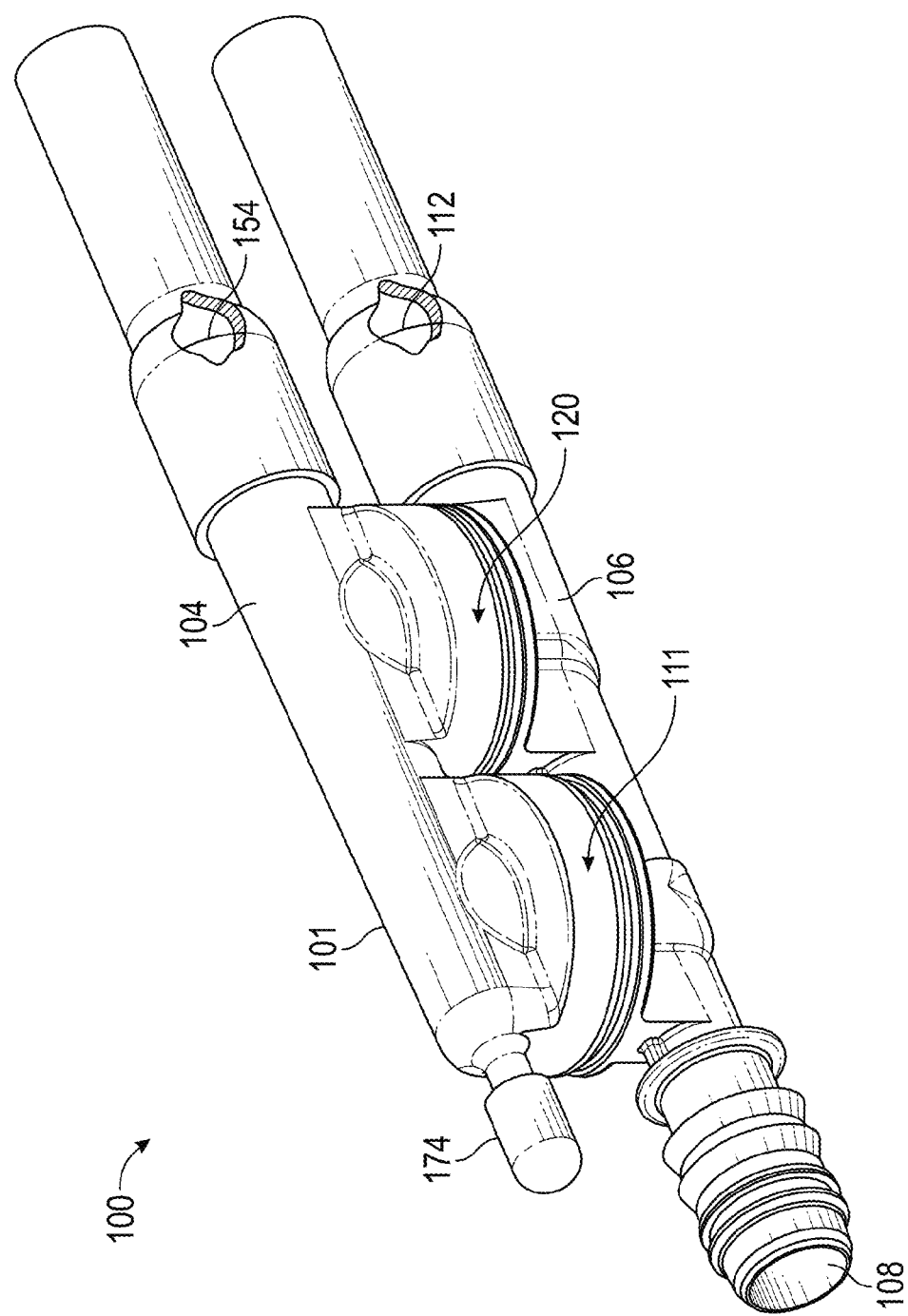
FIG. 4 is a side, perspective view of one embodiment of an aspirator having the improved sealing member.

FIG. 4 is an external view of an aspirator-check valve assembly, generally identified by reference number 100, for use in an engine, for example, in a vehicle's engine. The engine may be an internal combustion engine that includes a device requiring a vacuum. Check valves are normally employed in an internal combustion engine in the air flow line between the engine block and the air intake port at the full mixing port, normally a carburetor or fuel injection port. The engine and all its components and/or subsystems are not shown in the figures, with the exception of a few boxes included to represent specific components of the engine as identified herein, and it is understood that the engine components and/or subsystems may include any common to the internal combustion engines.

Figure 5:
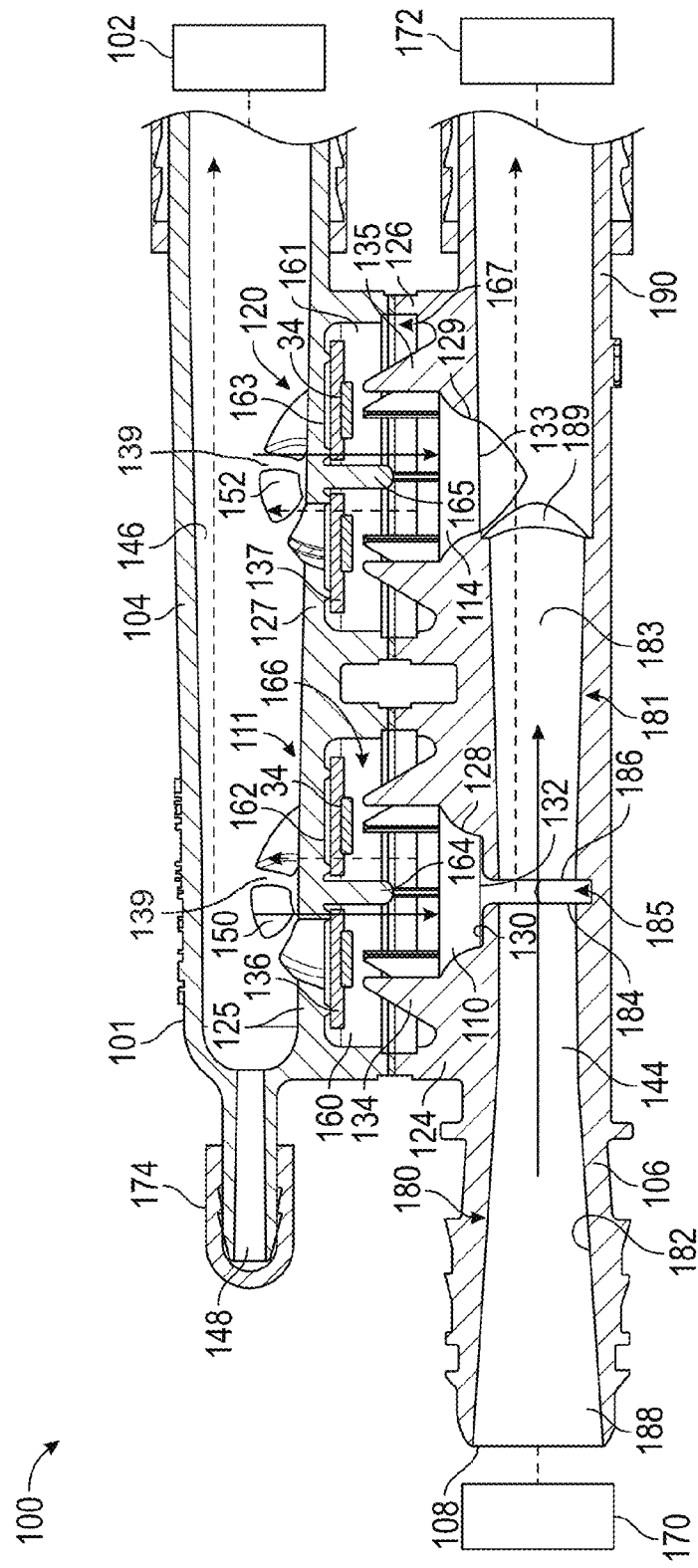
FIG. 5 is a side, longitudinal cross-sectional plan view of the aspirator of FIG. 4.

Referring to FIGS. 4 and 5, the aspirator-check valve assembly 100 is connectable to a device requiring a vacuum 102 and creates vacuum for said device 102 by the flow of air through a passageway 144, extending generally the length of a portion of the aspirator-check valve assembly, designed to create the Venturi effect. The aspirator-check valve assembly 100 includes housing 101, which as illustrated is formed of an upper housing portion 104 and a lower housing portion 106. The designations of upper and lower portions are relative to the drawings as oriented on the page, for descriptive purposes, and are not limited to the illustrated orientation when utilized in an engine system. Preferably, upper housing portion 104 is joined to lower housing portion 106 by sonic welding, heating, or other conventional methods for forming an airtight seal therebetween.

Still referring to FIGS. 4 and 5, the lower housing portion 106 defines passageway 144 which includes a plurality of ports, some of which are connectable to components or subsystems of the engine. The ports include: (1) a motive port 108, which supplies clean air from the engine intake air cleaner 170, typically obtained upstream of the throttle of the engine; (2) a suction port 110, which can connect via the check valve 111 to a device requiring vacuum 102; (3) a discharge port 112, which is connected to an engine intake manifold 172 downstream of the throttle of the engine; and, optionally, (4) a bypass port 114. Check valve 111 is preferably arranged to prevent fluid from flowing from the suction port 110 to the application device 102. In one embodiment, the device requiring vacuum 102 is a vehicle brake boost device. The bypass port 114 may be connected to the device requiring vacuum 102 and, optionally, may include a check valve 120 in the fluid flow path therebetween. Check valve 120 is preferably arranged to prevent fluid from flowing from the bypass port 114 to the application device 102.

As shown in FIG. 5, lower housing portion 106 includes lower valve seats 124, 126. Each lower valve seat 124, 126 is defined by a continuous outer wall 128, 129, and, optionally, a bottom wall such as wall 130 in lower valve seat 124. A bore 132, 133 is defined in each lower valve seat 124, 126 to allow for air flow communication with air passageway 144. Each lower valve seat 124, 126 includes a plurality of radially spaced fingers 134, 135 extending upwardly from an upper surface thereof. The radially spaced fingers 134, 135 serve to support a seal member 136, 137.

Referring again to FIGS. 4 and 5, the upper housing portion 104 is configured for mating to or with the lower housing portion 106 to form the check valves 111, 120, if both are present. Upper housing portion 104 defines passageway 146 extending the length thereof and defines a plurality of ports, some of which are connectable to components or subsystems of the engine. The ports include: (1) a first port 148 that may be capped with cap 174 or may be connected to a component or subsystem of the engine; (2) a second port 150 in fluid communication with the suction port 110 in the lower housing portion 106, and between which the seal member 136 is disposed; (3) a third port 152 in fluid communication with the bypass port 114 in the lower housing portion 106, and between which the seal member 137 is disposed; and (4) a fourth port 154 which may function as an inlet connecting the aspirator-check valve assembly to a device requiring vacuum 102.

As shown in FIG. 5, the upper housing portion 104 includes upper valve seats 125, 127. Each upper valve seat 125, 127 is defined by continuous outer wall 160, 161 and bottom wall 162, 163. Both upper valve seats 125, 127 may include a pin 164, 165 extending downwardly from the bottom walls 162, 163, respectively, toward the lower housing portion 106. The pins 164, 165 function as a guide for translation of the sealing members 136, 137 within the cavities 166, 167 defined by the mated upper valve seat 125 with the lower valve seat 124 and defined by the mated upper valve seat 127 with the lower valve seat 126.

Each sealing member 136, 137 may be a reinforced sealing member as described above that includes the reinforcing member 34. As illustrated, each sealing member 136, 137 includes a bore therethrough sized and positioned therein for receipt of the pin 164,165 within its respective cavity 166, 167.

Referring again to FIG. 5, the passageway 144 in the lower housing portion 106 has an inner diameter along a central longitudinal axis that includes a first tapering portion 182 (also referred to herein as the motive cone) in the motive section 180 of the lower housing portion 106 coupled to a second tapering portion 183 (also referred to herein as the discharge cone) in the discharge section 181 of the lower housing portion 106. Here, the first tapering portion 182 and the second tapering portion 183 are aligned end to end (outlet end 184 of the motive section 180 to inlet end 186 of the discharge section 181). The inlet ends 188, 186 and the outlet ends 184, 189 may be any circular shape, ellipse shape, or some other polygonal form and the gradually, continuously tapering inner dimensions extending therefrom may define, but are not limited to, a hyperboloid or a cone. Some example configurations for the outlet end 184 of the motive section 180 and inlet end 186 of the discharge section 181 are presented in FIGS. 4-6 of co-pending U.S. Patent Application No. 61/833,746, filed Jun. 11, 2013, incorporated by reference herein in its entirety. As seen in FIG. 5, a Venturi gap 185 is defined between the outlet end 184 of the motive section 180 and the inlet end 186 of the discharge section 181.

As seen in FIG. 5, the first tapering portion 182 terminates at a fluid junction with suction port 110, which is in fluid communication therewith, and at this junction the second tapering portion 183 begins and extends away from the first tapering portion 182. The second tapering portion 183 is also in fluid communication with the suction port 110. The second tapering portion 183 then forms a junction with the bypass port 114 proximate the outlet end 189 of the second tapering portion and is in fluid communication therewith. The first and second tapering portions 182,183 typically share the central longitudinal axis of the lower housing portion 106.

Still referring to FIG. 5, the inner diameter of the second tapering portion 183 tapers gradually, continuously from a smaller diameter inlet end 186 to a larger diameter outlet end 189. This inner diameter may be any circular shape, ellipse shape, or some other polygonal form, including but not limited to a hyperboloid or a cone. The optional bypass port 114 may intersect the discharge section 190 as described above to be in fluid communication with the second tapering section 183. The bypass port 114 may intersect the second tapering section 183 adjacent to, but downstream of the outlet end 189. The lower housing portion 106 may thereafter, i.e., downstream of this intersection of the bypass port, continue with a cylindrically uniform inner diameter until it terminates at the discharge port 112. Each of the respective ports 108, 110, 112, and 114 may include a connector feature on the outer surface thereof for connecting the passageway 144 to hoses or other features in the engine.

When the aspirator-check valve assembly 100 is connected into an engine system, for example as illustrated in FIG. 5, the check valves 111 and 120 function as follows. As the engine operates, the intake manifold 172 draws air in motive port 180, through passageway 144, and out the discharge port 112. This creates a partial vacuum in the check valves 111, 120 and passageway 146 to draw seals 136, 137 downward against the plurality of fingers 134, 135. Due to the spacing of fingers 134, 135, free fluid flow from passageway 144 to passageway 146 is allowed. The partial vacuum created by the operation of the engine serves in the vacuum assistance of at least the operation of the device requiring vacuum 102.

The air flow system in the typical internal combustion engine operates on the principle that as the engine operates, a partial vacuum is created which pulls air through the air intake port of the carburetor or fuel injector to aid in proper fuel combustion. This vacuum has been found to be useful in supplementing vacuum assist subsystems in the vehicle, particularly brakes, automatic transmissions and most recently, air conditioners. Aspirator-check valve assemblies such as assembly 100 may provide a connection between the main airway and the subsystem and serve to inhibit back pressure from the subsystem from disturbing airflow through the main airway.

The check valves disclosed herein, with the inclusion of the reinforcing member, have several advantages over other check valves. One advantage is that the check valve, in particular the sealing member, seals at low changes in pressure, but can withstand high changes in pressure (for example, an engine backfire). Other advantages include a reduction in the leak rate when the sealing member is in a closed position, the material that the sealing member is made of is prevented from "extruding" through, into, or around the radially spaced arms 36, 139, and results in low flow restrictions through the check valve.

Although the invention is shown and described with respect to certain embodiments, modifications will occur to those skilled in the art upon reading and understanding the specification, and the present invention includes all such modifications.

What is claimed is:

1. A check valve comprising:
a housing defining an internal cavity having a first port and a second port both in fluid communication therewith; and
a sealing member within the cavity, wherein the sealing member is a generally flat disc translatable between a closed position against a first seat within the internal cavity of the housing and an open position against a second seat within the internal cavity of the housing;
wherein the sealing member comprises a sealing material positioned for sealing engagement with the first seat when the sealing member is in the closed position and a reinforcing member positioned for engagement with the second seat when the sealing member is in the open position;
wherein, in the open position, fluid communication with the second port is through the second seat;
wherein the first seat includes a first annular seal bead surrounding an opening defined by the housing for fluid communication between the internal cavity and the first port, and a second seal bead disposed radially inward of the first annular seal bead and separated therefrom by the opening defined by the housing for fluid communication between the internal cavity and the first port; and
wherein the reinforcing member comprises a material different than the sealing material of the sealing member.

2. The check valve of claim 1, wherein the housing includes a pin, the sealing member includes a bore therethrough, and the pin of the housing is received in the bore of the sealing member for translation of the sealing member along the pin.

3. The check valve of claim 1, wherein the second seat is a plurality of radially spaced apart fingers extending into the internal cavity.

4. The check valve of claim 1, wherein the reinforcing member is mounted on the exterior surface of the sealing material or is encased within the sealing material.

5. The check valve of claim 1, wherein the sealing material is over-molded onto a portion of the reinforcing member.

6. The check valve of claim 1, wherein the reinforcing member is a ring of material having a width of about 2 mm to about 4 mm, the width being the difference between the inner diameter and the outer diameter of the ring of material.

7. The check valve of claim 1, wherein the sealing member seals in the closed position under a change in pressure of about 1.0 kPag to about 6.0 kPag.

8. The check valve of claim 1, wherein the check valve is incorporated into an aspirator.

9. An aspirator comprising:
a check valve according to claim 1 controlling fluid flow through a bypass port downstream from a Venturi gap.

10. The check valve of claim 1, further comprising one or more guides positioned about the periphery of the sealing member.

11. The check valve of claim 10, wherein the sealing member includes fluting in its periphery that align with the one or more guides.

12. The check valve of claim 1, wherein the reinforcing material member of the sealing member is positioned at least partially radially inward relative to the position of the first annular seal bead.

13. The check valve of claim 12, wherein the reinforcing member of the sealing member is positioned radially outward relative to the position of the second annular seal bead.

14. An aspirator comprising:
a check valve according to claim 1 controlling fluid flow through a suction port aligned with a Venturi gap.

15. The aspirator of claim 14, further comprising a second check valve according to claim 1 controlling fluid flow through a bypass downstream from the Venturi gap.

16. A check valve comprising:
a housing defining an internal cavity having a first port and a second port both in fluid communication therewith; and
a sealing member within the cavity, wherein the sealing member is a generally flat disc translatable between a closed position against a first seat within the internal cavity of the housing and an open position against a second seat within the internal cavity of the housing;
wherein the sealing member comprises a sealing material positioned for sealing engagement with the first seat when the sealing member is in the closed position and a reinforcing member positioned for engagement with the second seat when the sealing member is in the open position;
wherein the second seat is a plurality of radially spaced apart fingers extending into the internal cavity;
wherein the first seat includes a first annular seal bead surrounding an opening defined by the housing for fluid communication between the internal cavity and the first port, and a second seal bead disposed radially inward of the first annular seal bead and separated therefrom by the opening defined by the housing for fluid communication between the internal cavity and the first port; and
wherein the reinforcing member comprises a material different than the sealing material of the sealing member.

17. The check valve of claim 16, wherein the reinforcing member is mounted on the exterior surface of the sealing material or is encased within the sealing material.

18. The check valve of claim 16, wherein the sealing material is over-molded onto a portion of the reinforcing member.

19. The check valve of claim 16, wherein the reinforcing member is a ring of material having a width of about 2 mm to about 4 mm, the width being the difference between the inner diameter and the outer diameter of the ring of material.

20. The check valve of claim 16, wherein the sealing member seals in the closed position under a change in pressure of about 1.0 kPag to about 6.0 kPag.

* * * * *

UNITED STATES PATENT AND TRADEMARK OFFICE
CERTIFICATE OF CORRECTION

| | | |
|---|---|---|
| PATENT NO. | : 9,581,258 B2 | Page 1 of 1 |
| APPLICATION NO. | : 14/600598 | |
| DATED | : February 28, 2017 | |
| INVENTOR(S) | : David Fletcher et al. | |

It is certified that error appears in the above-identified patent and that said Letters Patent is hereby corrected as shown below:

In the Claims

In Claim 12, Column 8, Line 8, reads:
"material member of the sealing member is positioned at least"

It should read:
-- member of the sealing member is positioned at least --

Signed and Sealed this
Twelfth Day of September, 2017

Joseph Matal
*Performing the Functions and Duties of the*
*Under Secretary of Commerce for Intellectual Property and*
*Director of the United States Patent and Trademark Office*